United States Patent [19]

Hori

[11] Patent Number: 5,295,513

[45] Date of Patent: Mar. 22, 1994

[54] PILOT VALVE APPARATUS

[75] Inventor: Shuji Hori, Kawasaki, Japan

[73] Assignee: Kabushiki Kaisha Komatsu Seidakusho, Tokyo, Japan

[21] Appl. No.: 957,412

[22] Filed: Oct. 5, 1992

Related U.S. Application Data

[63] Continuation-in-part of Ser. No. 768,329, Oct. 17, 1991, Pat. No. 5,209,263.

[51] Int. Cl.$^5$ .............................................. F15B 13/02
[52] U.S. Cl. .................................. 137/636.2; 137/557
[58] Field of Search .................... 137/557, 636.1, 636.2

[56] References Cited

U.S. PATENT DOCUMENTS

| | | | |
|---|---|---|---|
| 3,026,892 | 3/1962 | Tsien | 137/628.62 X |
| 3,766,944 | 10/1973 | Distler | 137/636.2 X |
| 4,014,509 | 3/1977 | Yoshino et al. | 137/625.61 X |
| 4,416,189 | 11/1983 | Budzich | 137/596.1 |
| 4,461,320 | 7/1984 | Barbagli | 137/636.2 X |

FOREIGN PATENT DOCUMENTS 3-249413  11/1991  Japan .

OTHER PUBLICATIONS

PCT Publication WO91/3282 published Sep. 5, 1991.

Primary Examiner—Gerald A. Michalsky
Attorney, Agent, or Firm—Richards, Medlock & Andrews

[57] ABSTRACT

A highly reliable pilot valve apparatus controls the direction of the operation of an actuator by pivoting a lever (15) back and forth and to the right and left. A valve body (1) has a directional control spool (27) which shifts between a first position wherein it ensures that a pair of outlet ports ($3_3$, $3_4$) communicate with a pair of main outlet ports (38, 39) in a forward direction and a second position wherein it ensures that the pair of outlet ports communicate with the pair of main outlet ports in a rearward direction. The directional control spool (27) is changed over between the first and second positions by an oil from another pair of outlet ports ($3_1$, $3_2$). Alternatively, the valve body (1) can contain a pressure detecting directional control valve (61) such that in a first position a pressure sensing port (60) is connected to the inlet port (52) and in a second position the pressure sensing port (60) is disconnected from the inlet port (52). The pressure detecting directional control valve (61) contain a first spool (64) and a second spool (65) positioned in a sleeve (63) so that a first pressure receiving chamber (69) is between the first and second spools and a second pressure receiving chamber (70) is at the end of the second spool (65) which is remote from the first spool (64). Each of the first and second pressure receiving chambers (69, 70) is connected to a respective one of the outlet ports (53, 53). A spring (68) biases the first and second spools (64, 65) toward the position disconnecting the pressure sensing port (60) to the inlet port (52).

17 Claims, 6 Drawing Sheets

FIG. 1
FIG. 2
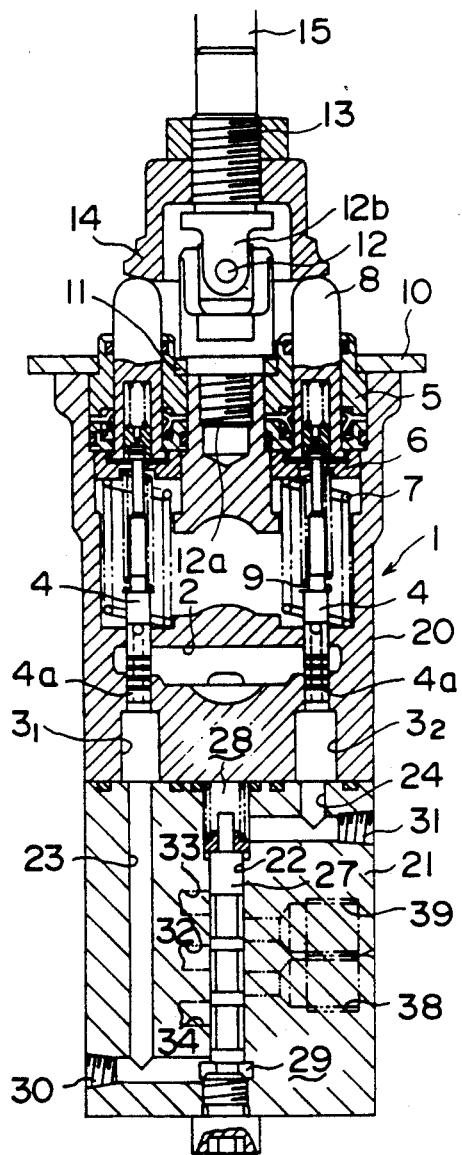
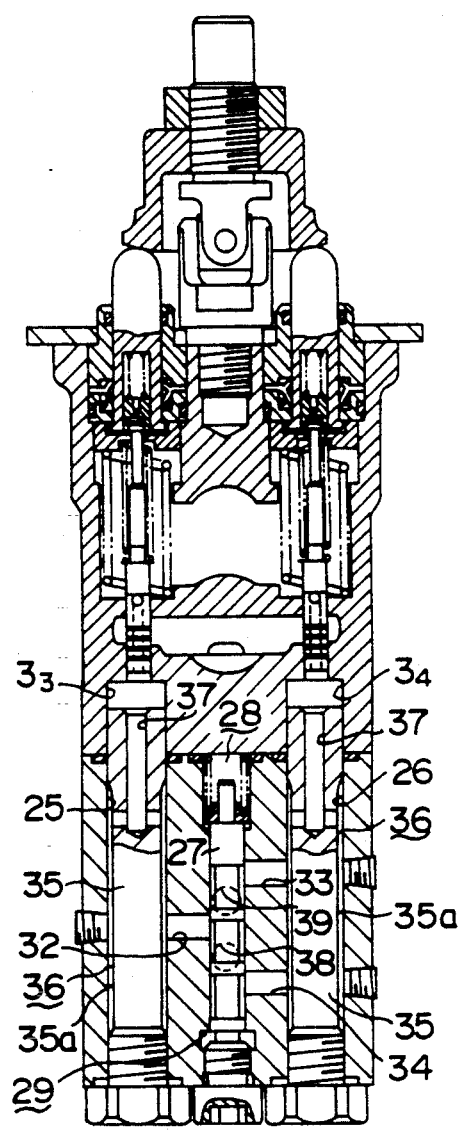

SECOND POSITION   FIRST POSITION

PILOT VALVE APPARATUS

RELATED APPLICATIONS

This application is a continuation-in-part of copending U.S. patent application Ser. No. 07/768,329, filed on Oct. 17, 1991, now U.S. Pat. No. 5,209,263, based on International Application PCT/JP91/00262, having an international filing date of Feb. 27, 1991 and a claim of priority to Japanese Utility Model Application 2-18212, filed Feb. 27, 1990.

FIELD OF THE INVENTION

The present invention relates to a pilot valve apparatus which is designed to supply oil by the pivoting of a lever back and forth and to the right and left.

BACKGROUND OF THE INVENTION

In a conventional pilot valve apparatus shown in FIG. 9, a valve body 1 has four slidable spools 4 to connect an oil port 2 to outlet ports 3 and to disconnect the oil port 2 from the outlet ports 3. A guide cylinder 5 is provided coaxially with respect to each of the spools 4, and a retainer 6 is disposed below the guide cylinder 5. The retainer 6 is pressed against the guide cylinder 5 by a main spring 7 do as to retain a piston 8 inserted into the guide cylinder 5 in such a manner as to be slidable therealong at an upper position. A spring 9 retains the spool 4 at a disconnecting position. A plate 10 is mounted on an upper portion of the valve body 1. The plate 10 has a hole 11 into which a proximal end 12a of a universal joint 12 is threadedly engaged with an upper portion of the valve body. A lever mounting shaft 13 is provided on a distal end 12b of the universal joint 12. Also, a disk 14 is mounted on the universal joint 12. When a lever 15, provided on the lever mounting shaft 13, is pivoted back and forth or to the right and left, one of the pistons 8 is pressed down to shift the associated spool 4 to the connecting position and thereby supply the oil in the oil port 2 to the outlet port 3 via an oil hole 4a of the respective spool 4.

Such a pilot valve apparatus is employed to change over a pilot pressure operated type operating valve for supplying an oil to an actuator in a work vehicle, such as a power shovel. A change-over of the operating valve is achieved when the oil is supplied to one of a pair of pilot pressure chambers of the pilot pressure operated type operating valve respectively connected to a pair of outlet-ports 3 by the pivoting of the lever 15. When the lever 15 is pivoted, for example, in the forward direction, the oil is supplied from the outlet port 3 located on that side. When the lever 15 is pivoted in the rearward direction, the oil is supplied from the outlet port 3 located on that side. Thus, the direction of the change-over of the operating valve is determined by the direction of the pivoting of the lever 15 to determine the direction of the operation of the actuator.

In some work vehicles, the direction of the operation of the actuator is made opposite from the direction of the pivoting of the lever 15. In that case, the direction of the flow of the oil outputted from the two outlet ports 3 must be changed before the oil is supplied to the pair of pilot pressure chambers of the operating valve.

Hence, as shown in FIG. 9, a solenoid operated directional control valve 17 is provided between a pair of conduits 16 respectively connected to the pair of outlet ports 3. The solenoid operated directional control valve 17 is operated by a limit switch 18 operated by the pivoting of the lever 15 to reverse the flow of the oil in the pair of conduits 16.

That is, the solenoid operated directional control valve 17 is retained at a first position which ensures that the oil flows in a forward direction, as shown in FIG. 10. When a solenoid 17a is energized, the solenoid operated directional control valve 17 is changed over to a second position. The solenoid 17a is energized by the limit switch 18.

In such a pilot valve, although the oil output from the outlet port 3 is reversed and then supplied to the pilot pressure chamber of the operating valve, the provision of the solenoid operated directional control valve, the limit switch, the wiring and conduits is required, thus increasing production cost and reducing reliability.

FIG. 11 is a graph showing the relationship between the output pressure of the conventional pilot valve apparatus and the lever stroke. As shown in FIG. 11, when the lever is shifted to stroke $S_1$, the pilot valve apparatus produces the output pressure $P_1$. Afterwards, the output pressure of the pilot valve apparatus increases in proportion to the lever stroke until it is equal to inlet pressure $P_2$ at stroke $S_2$.

In a vehicle provided with actuators controlled by the pilot valve apparatus, there are requirements of control of an actuator, for example, an engine or brake valve, on the basis of the results of detection of the controlled state of another actuator.

Such examples include control of a governor of the engine in such a manner that the engine speed is increased from the idling state to a rated speed by the detection signal, control of a solenoid operated valve such that a parking brake for a swing motor or a travel motor is switched off, and control of an oil to the brake valve. To achieve these objectives, a pressure switch is conventionally provided at the outlet port 3 to detect the operation of the lever 15. Alternatively, pivoting of the lever 15 is detected as a control initiating signal for another actuator by detecting the pressure of the limit switch or by an ON signal thereof.

However, as shown in FIG. 11, when the operation stroke is $S_1$, the output pressure is $P_1$, which is, for example, 6 kg/cm$^2$. Since the detection signal must be outputted before the hydraulic actuator enters the actuator control area, it should be outputted by the time the output pressure is $P_1$. Furthermore, the pressure switch is designed to output no detection signal when the output pressure is between zero and $P_3$, which may be 3 kg/cm$^2$, to prevent erroneous operation.

Thus, the activated area of the pressure switch is in the narrow region between $P_3$ and $P_1$, which may be between 3 and 6 kg/cm$^2$. Consequently, a high-precision pressure switch must be provided to accurately output the detection signal. This requires a very expensive pressure switch.

In the case of the limit switch, a detection signal is outputted when the operation stroke of the lever 15 is between zero and $S_1$. Therefore, a highly accurate positioning of the limit switch is necessary, making the mounting work thereof troublesome.

SUMMARY OF THE INVENTION

An object of the present invention is to provide a pilot valve apparatus which can eliminate the aforementioned problems of conventional techniques.

To achieve this, a valve body has a directional control spool which shifts between a first position wherein the spool makes a pair of outlet ports communicate with a pair of main outlet ports in a forward direction and a second position wherein said spool makes the pair of outlet ports communicate with the pair of main outlet ports in a rearward direction. The directional control spool is shifted between the first and second positions by an oil from another pair of outlet ports. Consequently, the direction of the pivoting of the lever and the direction of the output of the oil can be reversed from each other without using a switch, wiring or external conduits.

Furthermore, the valve body has a pressure detecting port, and a pressure detecting directional control valve which provides connection between the pressure detecting port and an inlet port and disconnection of the pressure detecting port from the inlet port. The pressure detecting directional control valve is located at the connecting position when the pressure at an outlet port reaches a set pressure, and is at the disconnecting position when the pressure at the outlet port is less than the set pressure. Consequently, the operating area of the pressure switch can be enlarged, making possible the use of a pressure switch which is not very accurate.

BRIEF DESCRIPTION OF THE DRAWINGS

FIG. 1 is a vertical cross-sectional view of a pilot valve apparatus showing a first embodiment of the present invention;

FIG. 2 is a vertical cross-sectional view of the pilot valve apparatus taken along a plane perpendicular to the plane along which FIG. 1 is taken;

DETAILED DESCRIPTION OF THE PREFERRED EMBODIMENTS

Figure 9:
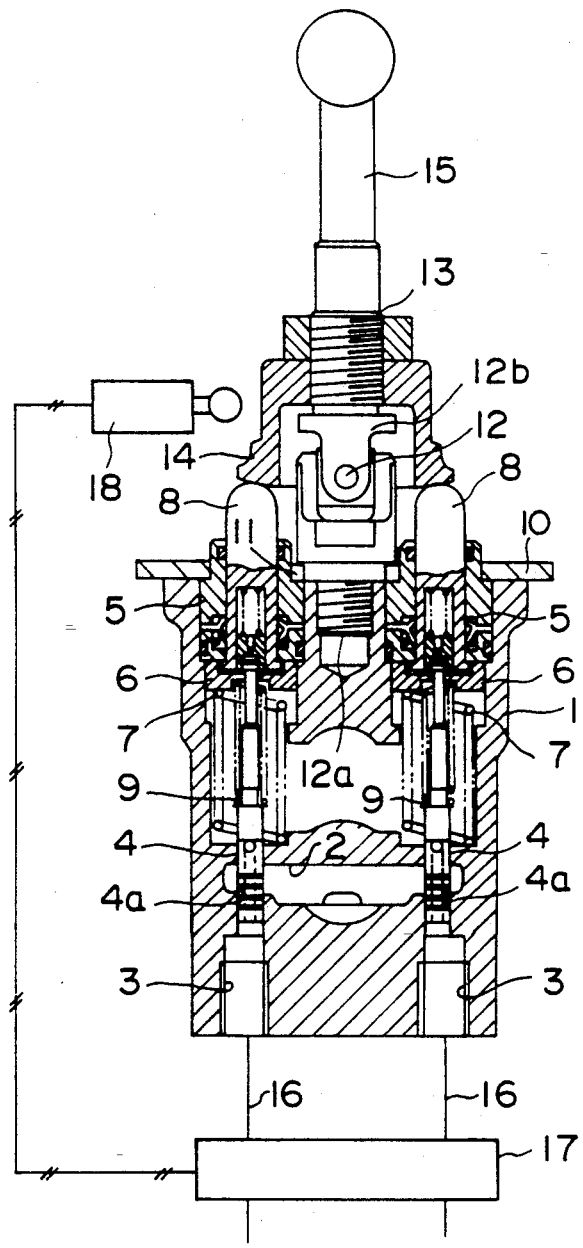
FIG. 9 is a vertical cross-sectional view of a conventional pilot valve apparatus taken from a front side thereof to a rear side thereof.
Figure 10:
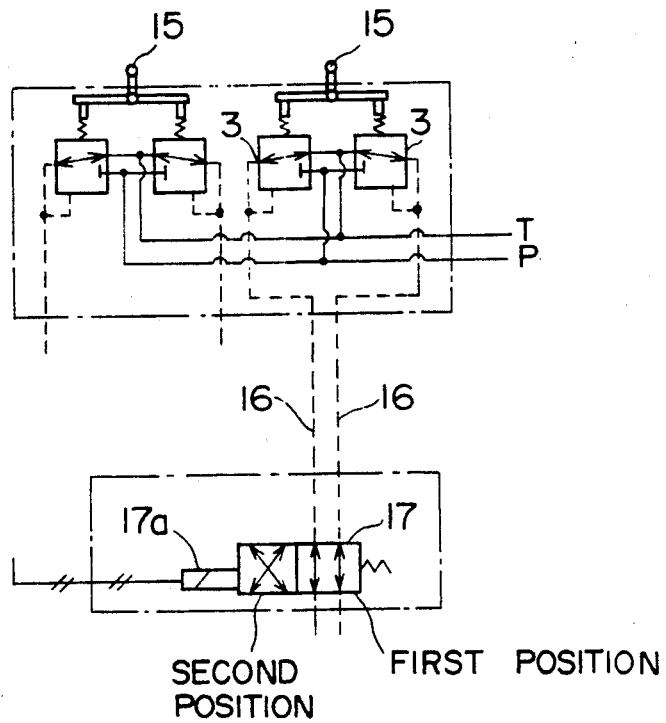
FIG. 10 schematically shows the conventional pilot valve apparatus.
Figure 11:
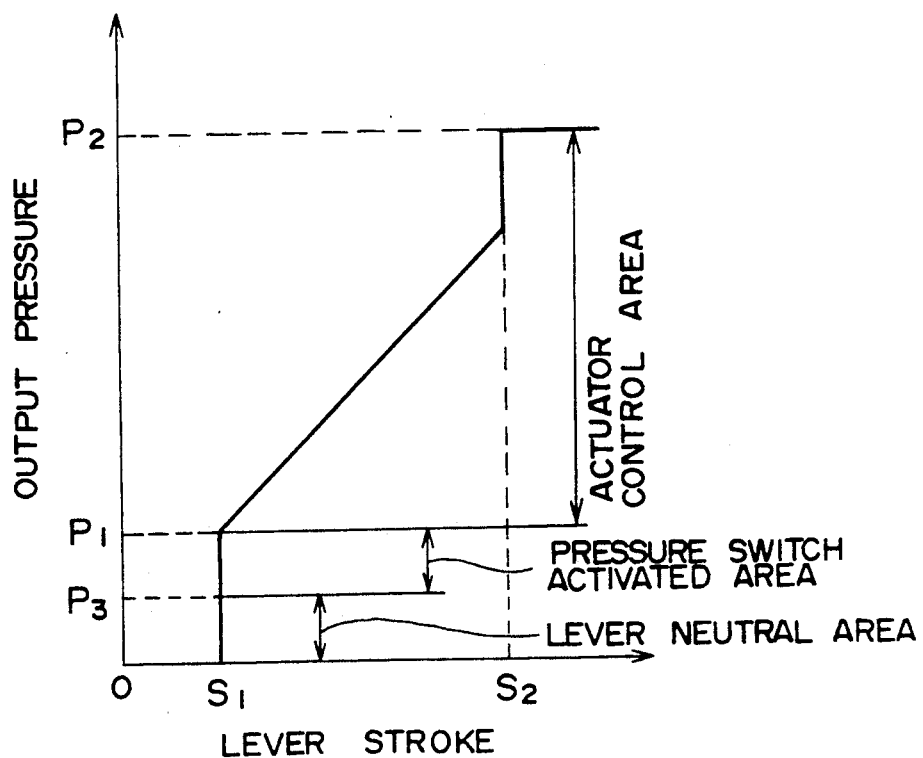
FIG. 11 is a graphic representation of the relationship between the output pressure of a conventional pilot valve apparatus and a lever stroke.

A first embodiment of the present invention will be described below. FIG. 1 is a vertical cross-sectional view of a pilot valve apparatus. FIG. 2 is a vertical cross-sectional view of the pilot valve apparatus taken along a plane perpendicular to the plane along which FIG. 1 is taken. Identical reference numerals in these figures to those in the conventional pilot valve apparatus of FIG. 9 represent similar or identical elements. In FIGS. 1 and 2, a pair of outlet ports located on the front and rear sides of the pilot valve apparatus are first and second outlet ports $3_1$ and $3_2$. A pair of outlet ports located on the right and left sides are third and fourth outlet ports $3_3$ and $3_4$.

A valve body 1 includes a pilot valve body 20 having four outlet ports 3 and four associated spools 4, and a directional control valve body 21. The directional control valve body 21 has a spool hole or chamber 22, and first, second, third and fourth holes or passageways 23, 24, 25 and 26. A directional control spool 27 is inserted into the spool hole 22 to form first and second pressure receiving chambers 28 and 29 at opposite ends of spool 27.

The first hole or passageway 23 opens into the first outlet port $3_1$, and communicates with both of the second pressure-receiving chamber 29 and a first main outlet port 30. The second hole or passageway 24 communicates with the first pressure-receiving chamber 28 and a second main outlet port 31. The third hole or passageway 25 communicates with the third outlet port $3_3$ and a first inlet port 32. The fourth hole or passageway 26 communicates with the fourth outlet port $3_4$ and second and third inlet ports 33 and 34. A rod member 35 having an intermediate small-diameter portion $35a$ is inserted into each of the third and fourth passageways 25 and 26, whereby a passage 36 is formed between each of the intermediate small-diameter portions $35a$ and the adjacent wall of each of the third and fourth passageways 25 and 26. The passages 36 open into the third and fourth outlet ports $3_3$ and $3_4$ via oil passages 37 formed in the rod members 35, and open into the first, second and third inlet ports 32, 33 and 34, as shown in FIG. 2.

The directional control spool 27 is shifted between first and second positions wherein it controls communications between the first, second and third inlet ports 32, 33 and 34 and the third and fourth main outlet ports 38 and 39 to constitute the directional control valve. The aforementioned structure is schematically shown in FIG. 3.

The operation of the pilot valve apparatus will be described below.

Figure 3:
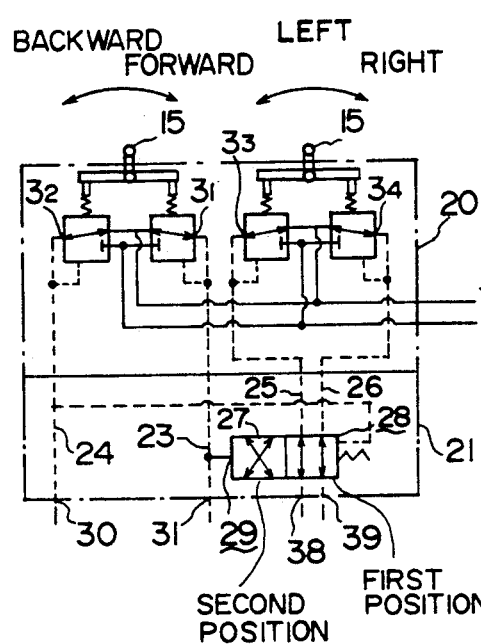
FIG. 3 schematically shows the first embodiment of the present invention.

When the lever 15 is at a neutral position, no oil is outputted from either of the outlet ports, and the spool 27 is retained at the first position shown in FIGS. 1–3 wherein it connects the first inlet port 32 to the third main outlet port 38 and connects the second inlet port 33 to the fourth main outlet port 39. That is, communications in the forward direction are provided.

When the lever 15 is pivoted to the right or to the left in that state and an oil is thereby supplied to either the third outlet port $3_3$ or the fourth outlet port $3_4$, the oil is outputted from either the third main outlet port 38 or the fourth main outlet port 39. That is, the direction Of the pivoting of the lever 15 corresponds to the direction of the output of the oil.

When the lever 15 is pivoted in a forward direction from the neutral position to supply an oil to the first outlet port $3_1$ and at the same to the right or to the left, the oil at the first outlet port $3_1$ is supplied to the second pressure-receiving chamber 29 to shift the directional control spool 27 to the second position. In the second position of the direction control spool 27, the first inlet port 32 communicates with the fourth main outlet port 39 while the third inlet port 34 communicates with the third main outlet port 38. That is, reverse communications are provided. Consequently, the oil at the third outlet port $3_3$ is supplied to the fourth main outlet port 39, while the oil at the fourth outlet port $3_4$ is supplied to the third main outlet port 38, i.e., the direction of the pivoting of the lever is opposite to the direction of the output of the oil.

Figure 4:
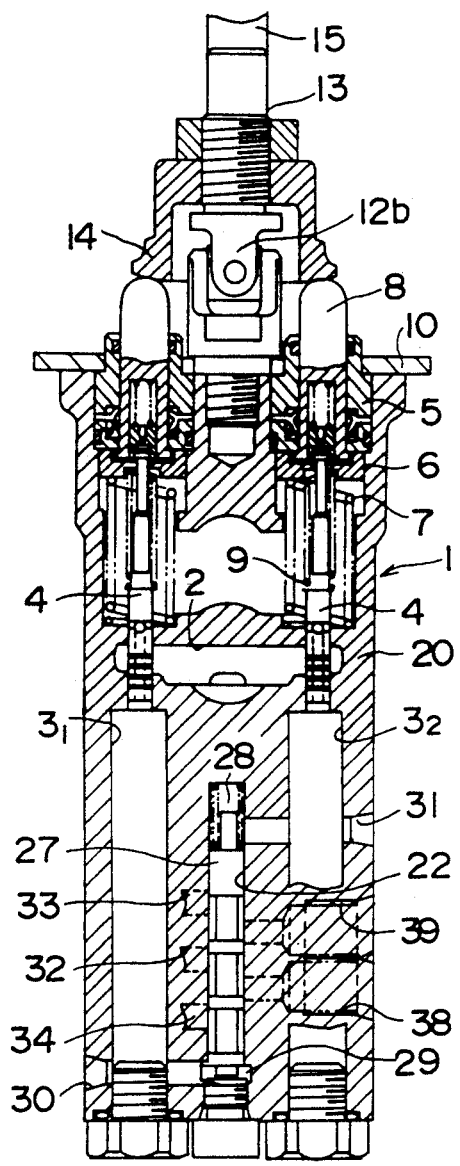
FIGS. 4 and 5 are vertical cross-sectional views of a modification of the first embodiment taken along planes which are perpendicular to each other.
Figure 5:
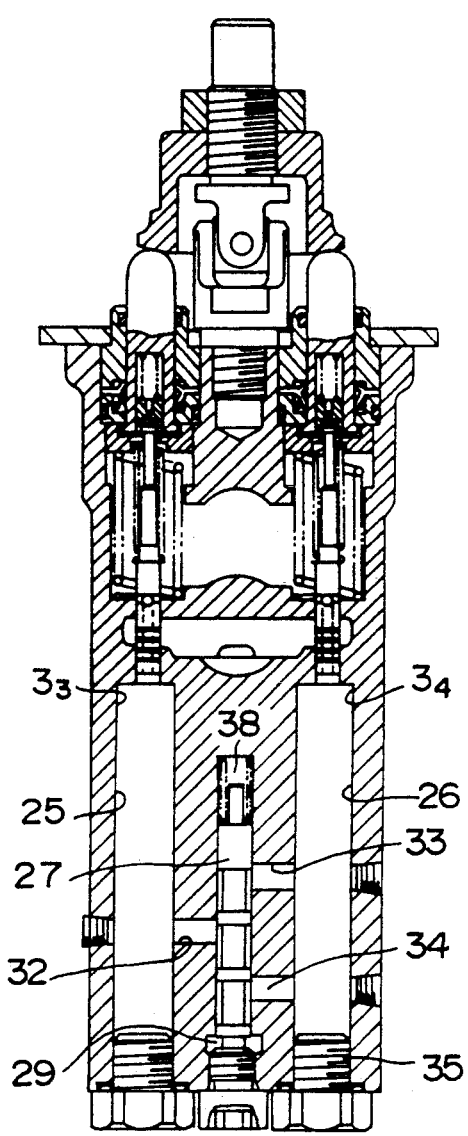

As shown in FIGS. 4 and 5, the pilot valve body 20 and the directional control valve body 21 may be formed as one unit. In that case, the spools 4 and the pistons 8 are provided in the upper portion of the pilot valve apparatus, while the directional control spool 27 is formed in the lower portion thereof.

In this pilot valve apparatus, provision of the wiring and external conduits is eliminated, since the directional control spool 27 is provided in the valve body 1. Furthermore, since the directional control spool 27 is changed over by the oil of another pair of outlet ports ($3_1$, $3_2$), no switch is necessary. Therefore, reliability is improved, and production cost is reduced.

Figure 6:
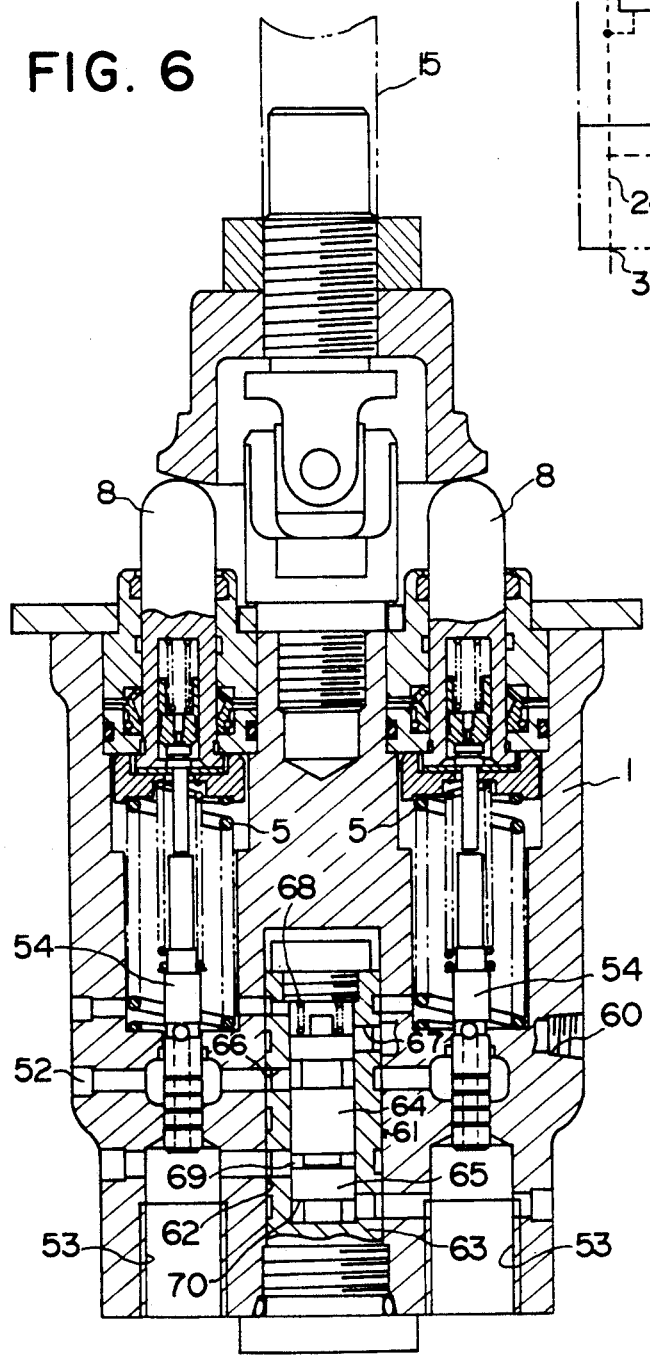
FIG. 6 is a vertical cross-sectional view of a second embodiment of the pilot valve apparatus taken from a front side thereof to a rear side thereof.
Figure 7:
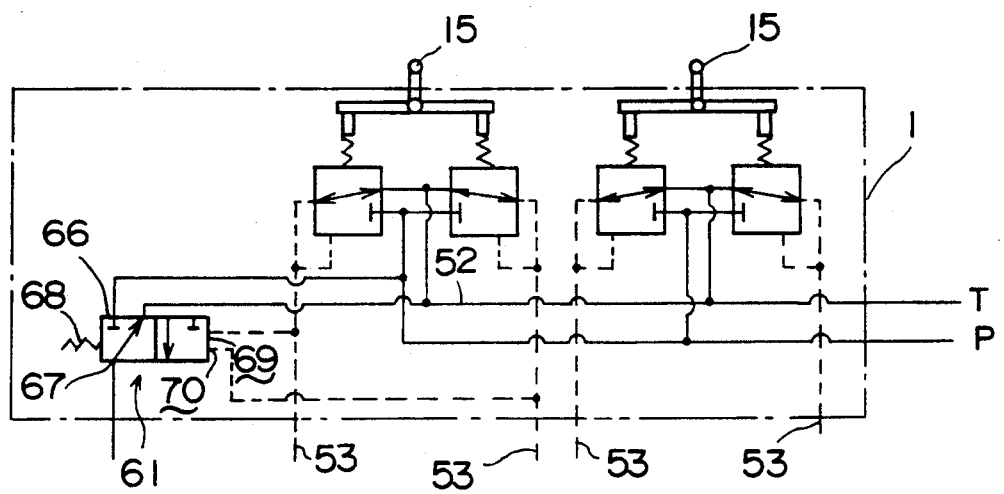
FIG. 7 schematically shows the second embodiment.

A second embodiment of the present invention will be described below with reference to FIGS. 6 through 8. Identical reference numerals in these figures to those in FIGS. 1 through 5 represent similar or identical elements. In FIG. 6, the valve body I has a pressure detecting port 60, and a pressure detecting directional control valve 61 which performs connection and disconnection of an inlet port 52.

The pressure detecting directional control valve 61 has a sleeve 63 inserted into a valve hole 62 in the valve body 1, and first and second spools 64 and 65 inserted in the sleeve 63. An inlet port 66 and an outlet port 67 are formed in the sleeve 63. The first spool 64 is retained by a spring 68 at a position where it disconnects the inlet port 66 from the outlet port 67. The first spool 64 is pushed by the oil in first and second pressure-receiving chambers 69 and 70 of the first and second spools 64 and 65 toward a position where the first spool 64 connects the inlet port 66 to the outlet port 67. The inlet port 66 communicates with the inlet port 52, and the outlet port 67 communicates with the pressure detecting port 60. The first pressure-receiving chamber 69 communicates with one of a pair of outlet ports 53, and the second pressure-receiving chamber 70 communicates with the other outlet port 53. As shown in FIG. 6, the second pressure receiving chamber 70 is always in communication with the other outlet port 53.

The inlet port 66 is connected to the outlet port 67 when the pressure in the first and second pressure-receiving chambers 69 and 70 is a set pressure $P_4$ which is slightly lower than the outlet pressure $P_1$ when the lever stroke is $S_1$. When the pressure in the outlet port 53 is the set pressure $P_4$, the output pressure of the pressure detecting port 60 is equal to an inlet pressure $P_2$. Thereafter, the outlet pressure remains the same. This structure is schematically shown in FIG. 7.

Figure 8:
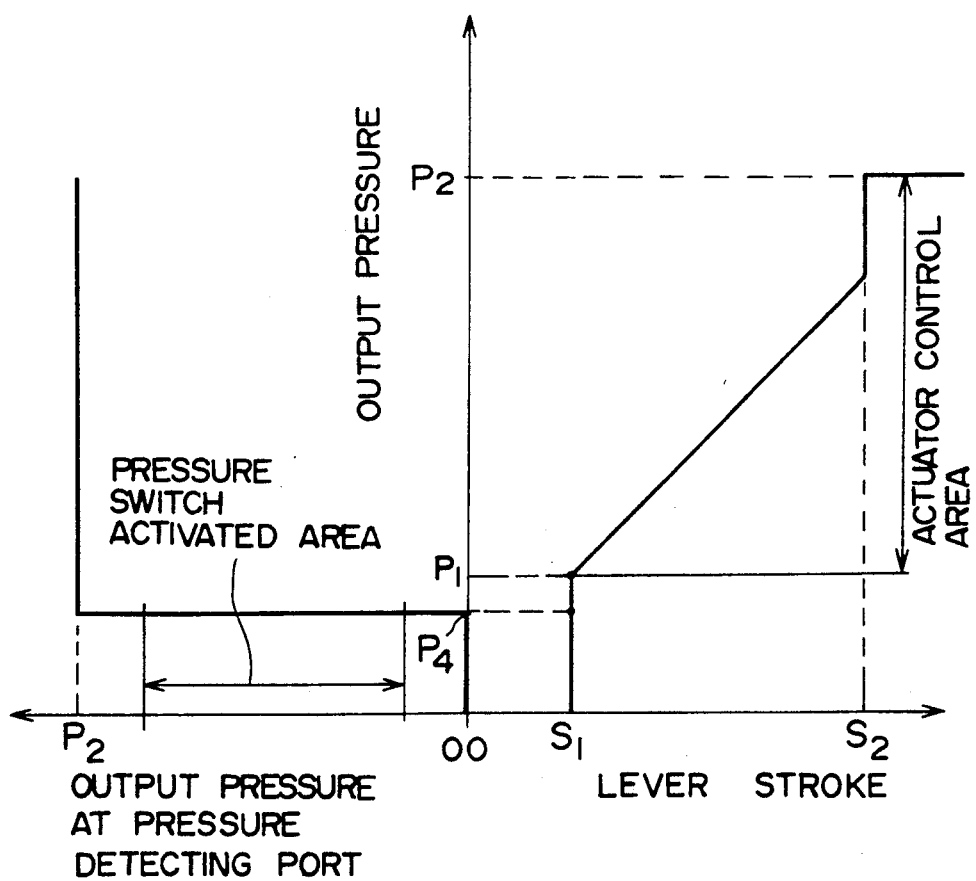
FIG. 8 is a graphic representation of the relationship between an output pressure, a lever stroke and a pressure detecting port output pressure.

Thus, when the output pressure of the outlet port 53 increases to the set pressure $P_4$ by the operation of the lever 15, the output pressure of the pressure detecting port 60 rapidly increases from zero to $P_2$, as shown in FIG. 8. It is thus possible to detect the time when the pilot valve enters an actuator control area by connecting the pressure switch to the pressure detecting port 60. The pressure switch activated area can be enlarged to a region of, for example 3 to 25 kg/cm$^2$.

It is also possible to use the oil in the pressure detecting port 60 as a signal pressure as it is.

Thus, since the activated area of the pressure switch in the pressure detecting port 60 is greatly enlarged from a conventional region of 3 to 6 kg/cm$_2$ to 3 to 25 kg/cm$_2$, a pressure switch which is not highly precise can be utilized.

What is claimed is:

1. In a pilot valve apparatus for outputting an oil at an inlet port of a valve body to an outlet port of the valve body by a stroke of a spool; wherein said valve body has a first pair of outlet ports and a second pair of outlet ports, for outputting oil from one of the pairs of outlet ports by pivoting a lever in a selected direction of movement of the lever;

the improvement characterized in that said valve body has a pressure detecting port, and a pressure detecting directional control valve is provided between said pressure detecting port and said inlet port to connect said pressure detecting port to said inlet port in a connecting position of said pressure detecting directional control valve and to disconnect said pressure detecting port from said inlet port in a disconnecting position of said pressure detecting directional control valve;

wherein said pressure detecting directional control valve comprises a first spool and a second spool positioned in a pressure detecting directional control valve chamber in said valve body to form first and second pressure receiving chambers, with said first pressure receiving chamber being between said first and second spools, with said second pressure receiving chamber being at the end of the said second spool which is remote from said first spool, said first pressure receiving chamber being in communication with one outlet port of one pair of said first and second pairs of outlet ports, and with said second pressure receiving chamber being in communication with the other outlet port of said one pair of said first and second pairs of outlet ports; and wherein a spring biases said first spool towards said second spool and said disconnecting position to said pressure detecting directional valve.

2. A pilot valve apparatus in accordance with claim 1 wherein said pressure detecting directional control valve is located at the connecting position when pressure on said pressure detecting directional control valve reaches a set pressure.

3. A pilot valve apparatus in accordance with claim 1 wherein the first and second spools of said pressure detecting directional control valve are positioned within a sleeve which is positioned in said valve body.

4. A pilot valve apparatus in accordance with claim 1 wherein said pressure detecting directional control valve is located at its connecting position when pressure on said pressure detecting directional control valve by fluid from said first pair of outlet ports of said valve body is at least a set pressure, and wherein said pressure detecting directional control valve is located at its disconnecting position when pressure on said pressure detecting directional control valve by the fluid from said first pair of outlet ports of said valve body is less than said set pressure.

5. In a pilot valve apparatus having a valve body with a first pair of outlet ports and a second pair of outlet ports, for outputting fluid from an output port selected from said first and second pairs of outlet ports by pivoting a lever in a corresponding direction;

the improvement characterized in that said valve body has a inlet port and a pressure detecting port, and a pressure detecting directional control valve is provided between said pressure detecting port and said inlet port.

said pressure detecting directional control valve being shiftable between a first position and a second position, said pressure detecting directional control valve in its first position connecting said pressure detecting port to said inlet port, said pressure detecting directional control valve in its second position disconnecting said pressure detecting port from said inlet port, said pressure detecting directional control valve being shifted between said first and second positions by pressure of fluid from said first pair of outlet ports of said valve body;

wherein said pressure detecting directional control valve comprises a first spool and a second spool positioned in a pressure detecting directional control valve chamber to form first and second pressure receiving chambers, with said first pressure receiving chamber being in communication with one outlet port of said first pair of outlet ports, and with said second pressure receiving chamber being in communication with other outlet port of said first pair of outlet ports;

wherein said pressure detecting directional control valve further comprises a spring which biases said first spool against said second spool to a first position of said first spool wherein said pressure detecting port is thereby disconnected from said inlet port, wherein said first pressure receiving chamber is located at a junction between said first and second spools, wherein said second pressure receiving chamber is located at the end of said second spool remote from said first spool, and wherein pressure in said first and second pressure receiving chambers tends to move said first spool against the bias of said spring to a second position of said first spool wherein said pressure detecting port is thereby connected to said inlet port.

6. A pilot valve apparatus in accordance with claim 5 wherein said first spool is located at its first position when the pressure in each of said first and second pressure receiving chambers is less than a set pressure, and wherein said first spool is located in its second position when the pressure in one of said first and second pressure receiving chambers is at least said set pressure.

7. A pilot valve apparatus in accordance with claim 6 wherein said valve body has a front spool chamber, a back spool chamber, a left spool chamber, and a right spool chamber, with each of said front spool chamber, said back spool chamber, said left spool chamber, and said right spool chamber having a valve spool positioned therein, each of said spool chambers being connected to a respective outlet port of said first and second pairs of outlet ports.

8. A pilot valve apparatus in accordance with claim 7 wherein each of said valve spools has a piston associated therewith, with each piston being selectively actuated by the movement of said lever in a selected direction, to thereby shift the associated valve spool.

9. A pilot valve apparatus in accordance with claim 5 wherein said valve body has a front spool chamber, a back spool chamber, a left spool chamber, and right spool chamber, with each of said front spool chamber, said back spool chamber, said left spool chamber, and said right spool chamber having a valve spool positioned therein, each of said spool chambers being connected to a respective outlet port of said first and second pairs of outlet ports.

10. A pilot valve apparatus in accordance with claim 9 wherein each of said valve spools has a piston associated therewith, with each piston being selectively actuated by the movement of said lever in a selected direction, to thereby shift the associated valve spool.

11. A pilot valve apparatus in accordance with claim 9 wherein each of said front and back spool chambers is connected to a respective one of said first pair of outlet ports, and wherein each of said left and right spool chambers is connected to a respective one of said second pair of outlet ports.

12. A pilot valve apparatus in accordance with claim 5 wherein said pressure detecting port is adapted to have a pressure switch connected thereto.

13. In a pilot valve apparatus wherein a valve body has an inlet port, at least a first pair of outlet ports, and at least a first pair of valve spools, each valve spool of said first pair of valve spools being associated with a respective one of said first pair of outlet ports and being selectively operable by pivoting a lever in a selected direction of movement of the lever for outputting oil from the inlet port to one of the first pair of outlet ports by a stroke of the associated one of said first pair of valve spools within the valve body;

the improvement characterized in that said valve body has a pressure detecting port, and a pressure detecting directional control valve is provided within said valve body between said pressure detecting port and said inlet port to connect said pressure detecting port to said inlet port in a connecting position of said pressure detecting directional control valve and to disconnect said pressure detecting port from said inlet port in a disconnecting position of said pressure detecting directional control valve;

wherein said pressure detecting directional control valve comprises a first spool and a second spool positioned in a pressure detecting directional control valve chamber in said valve body to form first and second pressure receiving chambers, with said first pressure receiving chamber being between said first and second spools, with said second pressure receiving chamber being at the end of the said second spool which is remote from said first spool, said first pressure receiving chamber being in communication with one outlet port of said first pair of outlet ports, and with said second pressure receiving chamber always being in communication with the other outlet port of said first pair of outlet ports.

14. A pilot valve apparatus in accordance with claim 13, wherein the first and second spools of said pressure detecting directional control valve are spring biased towards the disconnecting position of said pressure detecting directional control valve.

15. A pilot valve apparatus in accordance with claim 14, wherein said first spool is located at its first position wherein said pressure detecting port is thereby disconnected from said inlet port when pressure in each of said first and second pressure receiving chambers is less than a set pressure, and wherein said first spool is located in its second position wherein said pressure detecting port is thereby connected to said inlet port when pressure in one of said first and second pressure receiving chambers is at least said set pressure.

16. A pilot valve apparatus in accordance with claim 15, wherein said valve body has a front spool chamber, and a second spool chamber, with each of first and second spool chambers having a respective one of said first pair of valve spools positioned therein, each of said spool chambers being connected to a respective outlet port of said first pair of outlet ports.

17. A pilot valve apparatus in accordance with claim 16, wherein each of said first pair of valve spools has a piston associated therewith, with each piston being selectively actuated by the movement of said lever in a selected direction, to thereby shift the associated valve spool.

* * * * *

UNITED STATES PATENT AND TRADEMARK OFFICE
CERTIFICATE OF CORRECTION

PATENT NO. : 5,295,513
DATED      : March 22, 1994
INVENTOR(S): Shuji HORI

It is certified that error appears in the above-indentified patent and that said Letters Patent is hereby corrected as shown below:

Column 6, line 22, change "of the said" to --of said--.

Column 6, line 32, delete "to" and insert --of--.

Column 6, line 60, change "a inlet" to --an inlet--.

Column 7, line 9, delete "a first spool and a second spool" and insert --first and second spools--.

Column 7, line 54, after "and" insert --a--.

Column 8, line 56, delete "front" and insert --first--.

Column 8, line 57, after "of" insert --said--.

Signed and Sealed this

Sixth Day of September, 1994

Attest:

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,295,513
DATED : March 22, 1994
INVENTOR(S) : Shuji HORI

It is certified that error appears in the above-indentified patent and that said Letters Patent is hereby corrected as shown below:

On the title page, item [73], delete "Seidakusho" and insert --Seisakusho--.

Signed and Sealed this

Fourth Day of October, 1994

Attest:

BRUCE LEHMAN

*Attesting Officer*  *Commissioner of Patents and Trademarks*